United States Patent [19]

Clatfelter et al.

[11] Patent Number: 4,663,173
[45] Date of Patent: May 5, 1987

[54] HOT SOLUTION INJECTION

[75] Inventors: Kenneth A. Clatfelter, Farmington; John D. Story, Fayetteville; Jerry E. Webb, Farmington, all of Ark.

[73] Assignee: Campbell Soup Company, Camden, N.J.

[21] Appl. No.: 721,462

[22] Filed: Apr. 9, 1985

[51] Int. Cl.$^4$ .......................... A23L 1/31; A23L 1/315
[52] U.S. Cl. .................................. 426/281; 426/641; 426/644
[58] Field of Search ........................ 426/281, 641, 644

[56] References Cited

U.S. PATENT DOCUMENTS

| 2,418,914 | 4/1947 | Tichy. | |
|---|---|---|---|
| 2,687,961 | 8/1954 | Ellis. | |
| 2,709,658 | 5/1955 | Buchanan. | |
| 2,844,478 | 7/1958 | Hanley et al. | 426/281 X |
| 2,961,321 | 11/1960 | Williams | 426/281 |
| 3,119,696 | 1/1964 | Williams. | |
| 3,122,440 | 2/1964 | Williams | 426/281 X |
| 3,399,063 | 8/1968 | Schwall et al. | 426/281 |
| 3,462,278 | 8/1969 | Mahon. | |
| 3,615,689 | 10/1971 | Malinow et al. | 426/281 |
| 3,663,233 | 5/1972 | Keszler | 426/281 |
| 3,695,892 | 10/1972 | Reinke | 426/281 |
| 3,769,037 | 10/1973 | Sholl | 426/281 |
| 4,190,100 | 1/1980 | Wallace | 165/48 R |
| 4,551,338 | 11/1985 | Wallace | 426/281 |

FOREIGN PATENT DOCUMENTS

| 720072 | 10/1965 | Canada. | |
|---|---|---|---|
| 2030841 | 4/1980 | United Kingdom | 426/644 |

Primary Examiner—Arthur L. Corbin
Attorney, Agent, or Firm—Banner, Birch, McKie and Beckett

[57] ABSTRACT

A process for reducing total cooking time by treating meat flesh includes heating an aqueous solution to an elevated temperature; depositing the hot solution into the meat in a number of places thereby elevating the internal temperature and maximizing heat distribution efficiencies, and heating the hot treated meat until cooked.

11 Claims, No Drawings

HOT SOLUTION INJECTION

FIELD OF THE INVENTION

The invention relates generally to a process for preheating meat by hot injection to achieve a reduced total cooking time.

BACKGROUND OF THE INVENTION

Traditional processes directed toward the cooking of meats have emphasized techniques for replacing lost juices by manual basting and techniques for tenderizing through physical conditioning or aging. A significant reduction in total cooking time for meat preparation, however, has yet to be successfully achieved.

Innovations in commercial processing techniques, though limited by lengthy cooking periods, have focused primarily on ways of improving traditional processes, i.e., basting and tenderizing. Marinow, U.S. Pat. No. 3,615,689 discloses a method for reducing the oozing characteristic of injected basting. Chilled meats or poultry were injected with a basting emulsion of water and mixtures of oils and fats at a temperature just above the melting point of the fats. When subjected to chilling, the emulsion temperature permitted the fats and oils to solidify before seeping out of the carcass.

Schwall, U.S. Pat. No. 3,399,063, discloses that suspension of edible fat and phosphate salt at a temperature between 80° F. and 100° F. may be used to facilitate the production of air bubbles in an injection suspension. The air bubbles in suspension are used to expand the poultry, increasing the meat's capacity to hold the suspension rather than to initiate precooking.

Other tenderizing processes such as Williams, U.S. Pat. No. 3,119,696, have disclosed multiple injection of a solution and a gas. The solution, including proteolytic enzymes, salts, acids, gelatin and water, is injected at a temperature of 100° F. or higher followed by aging at reduced temperature. The gas is injected prior to the completion of rigor mortis either in conjunction with or after the injection of the solution.

Various flavor and moisture enhancing solutions have been developed to assist in the treatment of meats and poultry. Pooley, U.K. Pat. No. 2,030,841 discloses a process for injecting the carcass of one species with a solution of stock, or fat extract of another. The stock or fat extract, being a conductive medium for microbial activity, has been traditionally kept in a chilled environment prior to use. Pooley discloses that the extract may be pasteurized prior to injection thereby eliminating the need for chilling or preservatives. Once injected, however, Pooley discloses that the poultry is frozen.

Ellis, U.S. Pat. No. 2,687,961 discloses a process for reducing cooking shrinkage and fluid drainage by multiple injection of a solution at a temperature of 100° F. to about 200° F. The poultry, however, is chilled and packaged after injection and not subject to immediate cooking.

Buchanan, U.S. Pat. No. 2,709,658 likewise treats poultry flesh by hot injection prior to chilling and aging. The poultry is then subjected to either precooking by microwave, steam or by total immersion at elevated temperatures.

The prior processes for employing multiple injection or spraying of aqueous stock solutions have been directed toward either minimizing moisture and flavor loss attributable to normal cooking procedures or toward obtaining a higher quality, more tender piece of meat. Prior art processes employing injections of elevated temperature solutions have not been directed toward achieving a shorter total cooking time. In fact, prior art processes utilizing chilling and aging steps after injection have taught away from the novelty of the subject invention. Accordingly, a process which utilizes an increased internal temperature resulting from injection would be a highly desired advance in the art of cooking meat.

SUMMARY OF THE INVENTION

It is an object of the present invention to provide a preheating process for cleaned dressed meat which results in reduced total cooking time.

More particularly, it is an object of the invention to deposit a quantity of an aqueous solution into meat at a solution temperature which inhibits microbial growth.

A further object of the present invention is to deposit a quantity of a hot phosphate salt meat-stock solution by injection or spraying and to evenly disperse the hot solution within the tissue layers of cleaned dressed meat before cooking.

A yet further object of the present invention is to reduce total cooking time by eliminating separate seasoning steps through incorporating the seasoning into the hot salt-stock injection solution.

In accordance with these and other objectives, the present invention provides in one aspect, a process for treating meat to reduce total cooking time which comprises heating an aqueous solution to an elevated temperature, depositing said hot solution into the flesh of cleaned dressed meat to elevate the internal temperature of said meat to at least about 75° F. and achieve an even distribution of heat, and further heating the hot treated meat until cooked.

In a preferred aspect, the present invention provides a process for treating meat to reduce total cooking time which comprises heating an aqueous stock solution to a temperature range of between about 170° F. and about 204° F. to inhibit microbial growth, said aqueous stock solution comprising water, sodium phosphate, chloride salt, and meat stock, injecting the hot aqueous stock solution into the flesh of cleaned dressed meat in a number of places to elevate the internal temperature of said meat to about 75° F. and 140° F., and achieve an even distribution of heat; and further heating the hot treated meat until cooked.

DETAILED DESCRIPTION OF THE INVENTION

The present invention is based upon the discovery that total cooking time of cleaned dressed poultry, fish or other animal flesh (hereinafter referred to as meat), including carcasses or parts (e.g., boneless meat and tissue), may be decreased if a solution at an elevated temperature is deposited (e.g., by injection) into the meat flesh. The injection also serves to both eliminate separate seasoning steps and when followed by immediate cooking reduces total cooking time by maximizing heating efficiencies. In addition, by maintaining the solution within an elevated temperature range, microbial activity is inhibited thereby alleviating the need for preservatives common to some prior art processes.

While the invention is broadly directed to meat as defined, the following description will, for purposes of convenience, relate primarily to the use of this invention in treating poultry products. In accordance with the present invention, poultry flesh is prepared by standard processing procedures. Cleaned dressed poultry carcasses, parts or boneless meats and tissues, for example, are subject to single or multiple injection with a preheating solution heated to an elevated temperature. Injection may be accomplished by any number of methods recognized in the art including multiple needle injections at numerous sites on the poultry or single needle injection employing multiple radial ports. The injection may also take the form of high pressure spray projection of the preheating solution through the skin and into the inner layers of the poultry carcass.

The amount of heated preheating solution injected into the poultry carcass or part will depend on a number of factors such as the size and type of the part being processed, the composition of the solution and the like. While the weight of the injected part may increase by as much as 40%, the amount of phosphate in the finished product should be less than about 0.5%.

The preheating solution generally comprises hot water used alone or with any number of adjuvants commonly known to the meat preheating industry. These additives include for example phosphate salts, common table salts such as sodium chloride, spice flavorings, and meat stock. Although the preheating solution may be sterilized prior to injection by methods commonly known in the art it preferably is maintained at an elevated temperature at which microbial growth is inhibited. For purposes of this invention the term "aqueous solution" includes colloidal suspensions or emulsion formed by mixing fats or oils with water.

In one preferred embodiment, the preheating solution comprises an aqueous solution of sodium chloride and sodium polyphosphate.

In another preferred embodiment the preheating solution comprises an aqueous solution of sodium chloride, sodium polyphosphate, spice flavorings and meat stock (hereafter sometimes referred to as stock solution). The concentration of phosphate salt and chloride salt in the injection solution can vary in part on the weight and taste requirement of the meat. In general this preferred injection solution can comprise about 1 to 3% by weight phosphate salt and less than about 1 to 5% by weight chloride salt. Poultry stock concentration in the solution may be varied to produce a desired meat flavor. Poultry stock solution, for example, is collected from the extract of mature cleaned and dressed hens by methods commonly known in the art. In one preferred method, poultry carcasses are cooked in water for a period of time. The fat-free juices are pasteurized and then concentrated in evaporators.

Most commonly known phosphate salts may be used as preheating solution additives including noncyclic polyphosphates of alkali metals such as sodium or potassium and in particular sodium phosphate. Other acceptable phosphate salts include, sodium tripolyphosphate, sodium hexametaphosphate, tetrasodium pyrophosphate, sodium acid pyrophosphate, potassium tripolyphosphate, and tetrapotassium pyrophosphate.

In order to maximize heat distribution and minimize total cooking time, the preheating solution deposited in the poultry tissue layers should increase the internal meat temperature up to about 75° F. to about 140° F. In general, an injection solution temperature of at least about 125° F. and preferably between about 170° F. to 204° L F. is necessary to achieve the desired internal temperature. One advantage of the present invention is that by maintaining the preheating solution in a temperature range of between about 170° to about 204° F. prior to injection, microbial activity may be inhibited.

Hot poultry, treated with the preheating solution in accordance with the instant novel process is then breaded with a coating before a significant decrease in the internal temperature occurs. Coating materials are generally known in the art. Examples of these materials include flour, egg batter, seasoning, corn meal, or bread crumbs. The product is then fry cooked immediately in hot oil followed by cooking in a steam-hot air oven. Other conventional means for cooking the battered product commonly known in the art may also be employed. The term "cooked" is defined herein to include those states which extend from partially cooked to fully cooked according to commercially recognized standards in the art.

Specific examples illustrative of the instance novel process may be set out as follows and are not intended to limit the scope of the invention.

EXAMPLE 1

Twenty to thirty pounds of cleaned and dressed poultry breasts were retrieved from cold storage and injected by multiple needle injection with a hot aqueous stock solution. The injection solution was prepared by dissolving sodium phosphate and sodium chloride in water followed by the addition of poultry stock solution and mixing.

The breasts were then breaded with flour batter and fried in oil for 4 minutes at 355° F. and then cooked in a steam-hot air oven for 3½ to about 10 minutes. A decrease in total cooking time of approximately 5 minutes was encountered in comparison to identical parts injected with identical but unheated solutions.

EXAMPLE 2

Chicken leg parts (drums), breasts and thighs were prepared in accordance with the injection process of Example 1 using the same aqueous stock solution.

Listed below in Table 1 is a comparison of total cooking time encountered using hot injection in comparison with the total cooking time of control runs using the same type and weight of poultry part. As indicated, an improvement in cooking time of about 5.3 minutes for breasts, 3.2 minutes for drums, and 3.6 minutes for thighs was achieved by the process of the present invention.

TABLE 1

| Part | Process | Temp. of Injection Solution (°F.) | Cooking Time (min) |
|---|---|---|---|
| Breast | Hot Injection | 178–200 | 3.5 |
| Breast | Cold Injection | 40 | 8.8 |
| Drums | Hot Injection | 173–188 | 5.3 |
| Drums | Cold Injection | 40 | 8.5 |
| Thighs | Hot Injection | 193–198 | 9.3 |
| Normal for Thighs | | | 12.9 |

EXAMPLE 3

Chicken drums, breasts, and thighs were examined for microbial activity after being subjected to the injection process described in Example 1. In place of the aqueous stock solution, water heated to the temperature ranges described above in Table 1 were used. The results are shown in Table 2 below:

TABLE 2

| Part | Standard Plate Count* | Coli* | Staph* | Comment |
|---|---|---|---|---|
| Drum | 1 | 0 | 0 | Meat Only |
| Drum | 2 | 0 | 0 | Meat & Batter |
| Breast | 0 | 0 | 0 | Meat Only |
| Breast | 0 | 0 | 0 | Meat & Batter |
| Thigh | $10^2$ | 0 | 0 | Meat & Batter |
| Thigh | 0 | 0 | 0 | Meat Only |

*Data recorded in number of bacteria per gram of meat sample.

In arriving at the test data found in Table 2, 1 gram of ground cooked poultry (and batter where applicable) was subjected to further size reduction, serially diluted and then spread on agar. After incubation, standard plate count value of 100 bacteria per gram of poultry was recorded as the only sign of bacterial activity. As indicated, no activity was found for coli or staph bacteria. It is generally recognized by those skilled in the art that a standard plate count of $6 \times 10^4$ is acceptable in the food industry. The data shows that an injection solution may be used without preservatives as long as it is kept at a temperature greater than 170° F. prior to injection.

While preferred embodiments of the present invention have been shown and described herein, it is intended that many details may be changed without departing from the spirit and scope of the invention as defined in the appended claims.

The invention is claimed as follows:

1. A process for treating meat to reduce total cooking time which comprises:
   heating an aqueous solution to an elevated temperature;
   depositing said hot solution into the flesh of cleaned dressed meat to elevate the internal temperature of said meat to at least about 75° F. and achieve an even distribution of heat; and
   further heating the hot treated meat until cooked.

2. The process of claim 1 wherein said aqueous solution comprises water and chloride salt.

3. The process of claim 1 wherein said elevated temperature is at least about 125° F.

4. The process of claim 3 wherein said aqueous stock solution comprises water, a chloride salt, meat stock, and a noncyclic phosphate salt of an alkali metal.

5. The process of claim 1 wherein said hot solution is deposited by injection.

6. The process of claim 1 wherein said aqueous solution is an aqueous stock solution, wherein said solution is heated to a temperature of at least about 170° F., and wherein said hot solution is deposited by multiple needle injection.

7. The process of claim 1 wherein said hot solution is deposited by a high velocity spray.

8. A process for treating meat to reduce total cooking time which comprises
   heating an aqeuous stock solution to a temperature range between about 170° F. and about 204° F. to inhibit microbial growth, said aqueous stock solution comprising water, sodium phosphate, chloride salt, and meat stock;
   injecting the hot aqueous stock solution into the flesh of cleaned dressed meat in a number of places to elevate the internal temperature of said meat to about 75° F. and 140° F., and achieve an even distribution of heat; and
   further heating the hot treated meat until cooked.

9. The process of claim 8 wherein said meat comprises poultry.

10. The process of claim 9 wherein said meat is selected from the group consisting of poultry, fish or animal flesh.

11. A process for treating poultry flesh to reduce total cooking time which comprises:
    heating an aqueous stock solution to a temperature range between about 170° F. and about 204° F. to inhibit microbial growth, said aqueous stock solution comprising water, sodium phosphate, chloride salt, and poultry stock;
    injecting the hot aqueous stock solution into the flesh of cleaned dressed poultry in a number of places to elevate the internal temperature of said poultry to about 75° F. and 140° F., and achieve an even distribution of heat; and
    further heating the hot treated poultry until cooked.

* * * * *